(12) United States Patent
Huang et al.

(10) Patent No.: US 7,345,594 B2
(45) Date of Patent: Mar. 18, 2008

(54) NOISE ATTENUATION APPARATUS FOR BOREHOLE TELEMETRY

(75) Inventors: Songming Huang, Hardwick (GB);
Franck Monmont, Caldecote (GB);
Benoit Froelich, Marly-le-Roi (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 256 days.

(21) Appl. No.: 10/524,581

(22) PCT Filed: Aug. 19, 2003

(86) PCT No.: PCT/GB03/03616

§ 371 (c)(1),
(2), (4) Date: Aug. 26, 2005

(87) PCT Pub. No.: WO2004/022916

PCT Pub. Date: Mar. 18, 2004

(65) Prior Publication Data

US 2006/0109141 A1 May 25, 2006

(30) Foreign Application Priority Data

Sep. 6, 2002 (GB) .................................. 0220737.1

(51) Int. Cl.
*G01V 3/00* (2006.01)
(52) U.S. Cl. ................. 340/854.3; 340/855.4; 367/83
(58) Field of Classification Search ............. 340/854.3, 340/855.4, 856.3; 367/83
See application file for complete search history.

(56) References Cited

U.S. PATENT DOCUMENTS 3,716,830 A * 2/1973 Garcia ...................... 367/83
4,590,593 A * 5/1986 Rodney ..................... 367/83
4,715,022 A 12/1987 Yeo
5,146,433 A * 9/1992 Kosmala et al. ............ 367/83
5,386,479 A * 1/1995 Hersh ........................ 381/190
5,957,102 A 9/1999 Schorn
6,308,562 B1 * 10/2001 Abdallah et al. ........ 73/152.18
6,741,185 B2 5/2004 Shi et al.
2003/0151978 A1 8/2003 Jeffryes et al.

FOREIGN PATENT DOCUMENTS

| GB | 2 160 565 A | 12/1985 |
|---|---|---|
| GB | 2 271 494 A | 4/1994 |
| JP | 5-195746 A | 3/1993 |
| WO | WO 01/46548 A2 | 6/2001 |
| WO | WO 01/46548 A3 | 6/2001 |
| WO | WO 01/66912 A1 | 9/2001 |
| WO | WO 01/86325 A1 | 11/2001 |

* cited by examiner

OTHER PUBLICATIONS

"Reactive dampener versus a bladder reactive combination", product information on Model DR-240-7500CS reactive discharge dampener, Performance Pulsation Control Inc., P.O. Box 860396, Plano, TX 75086-0396, United States of America, issued by Stacy Oilfield Services Limited, Aberdeen, Scotland. Printed before Jun. 19, 2001 http://www.btinternet.com/~staceyoil/ pp. 1-14.

*Primary Examiner*—Timothy Edwards, Jr.
(74) *Attorney, Agent, or Firm*—Steven Gahlings; Vincent Loccisano; James McAleenan

(57) ABSTRACT

A surface mud pipeline system is described with a mechanical acoustic filter (1245) tuned to a predetermined frequency band so as to attenuate pump noise (132) within this band. The filter can be combined with a Venturi constriction to provide enhanced attenuation and is used to improve signal transmission of a mud pulse telemetry system (113-2).

25 Claims, 14 Drawing Sheets

NOISE ATTENUATION APPARATUS FOR BOREHOLE TELEMETRY

The present invention generally relates to an apparatus for attenuating pressure variations within a predetermined frequency band in the surface section of a drilling fluid flow system. It pertains to such apparatus for improving the transmission of telemetry signal between a downhole location and the surface. More specifically, it relates to an apparatus for reducing the pump noise in a mud pulse telemetry system.

BACKGROUND OF THE INVENTION

Typical drilling operations employ a number of techniques to gather information such as the depth and inclination of a borehole and the types of rocks through which a drill pipe and drill bit are drilling. For this purpose, techniques called Measurement-While-Drilling (MWD) and Logging-While-Drilling (LWD) were developed in the oil exploration and production industry. These techniques enable the collection of data in real-time. LWD collects logging information similar to the conventional wireline logging, while MWD also enables a driller to determine the position and orientation of the drill bit and direction of a borehole during the drilling operation so that the driller can more accurately control the drilling operations. For the purpose of the following description, these and similar techniques will be collectively referred to as "MWD".

Common to MWD techniques is the problem of transmitting data from the bottom of a borehole to a point on the surface where it can be collected and processed. A typical technique for this type of data transmission is mud pulse telemetry. During the drilling operation, drilling mud is pumped from a mud pump downward through the drill pipe and emerges near the drill bit at the bottom of the drill hole. This mud cools and lubricates the drill bit, carries rock cuttings to the surface where they can be analyzed and prevents the walls of the borehole from collapsing.

In mud pulse telemetry, a transmission device, or "pulser," such as an electromechanical pulser or a mud siren near the drill bit generates an acoustic signal that is transmitted upward to the surface through the downward traveling column of mud. Modern mud sirens, for example, are capable of generating a carrier pressure wave of 12 Hz. A transducer, typically at the surface, receives the signal and transmits it to a signal processor. The signal processor then decodes and analyzes the signal to provide information about the drilling operation to the driller.

A major problem with decoding and analyzing the signal is that noise seen by the transducer, generated by the drilling operation, obscures the signal. There are a number of potential sources of noise generated during MWD. Noise may be introduced by the turning of the drill bit and drill pipe and/or from the mud pump used to force the mud into the drill pipe. Another source of noise is a reflected signal that is created when the original signal hits a pulsation dampener, or "desurger", near the top of the mud column and is reflected back down the hole. In addition to noise, the MWD/LWD signal may be degraded by the type of mud, the mud pressure, the length and changes in diameter of the drill pipe and its joints, and the pulsation dampener. Of these potential and actual sources of noise, the noise generated by the mud pumps is often considered to be the one that interferes most dominantly with the signal.

The mud pump has two mechanisms of generating pressure fluctuation. The first is through the so-called "water hammer" effect due to imperfect synchronization of inlet/outlet valves at the beginning and end of each piston traversing cycle. This tends to produce pressure pulses of large amplitude and short duration. The second mechanism is through the pulsating nature of the flow generated by such pumps generating harmonic noise at each piston stroke.

To obtain reliable MWD signal decoding, slow data transmission rates are typically used (about 1 to 10 bit(s) per second) in order to sustain an acceptable signal-to-noise (S/N) ratio. If data transmission rates are increased, clock tracking and timing recovery, and the S/N ratio between the pulser and transducer become very sensitive and difficult to maintain due to the nature of the drilling operations, thus, decreasing the reliability of the MWD data.

Numerous techniques have been developed to reduce the effects of the noise sources on the signal, which can be broadly categorized as signal processing, including the use of differential measurements, signal amplification and/or repetition and mechanical noise attenuation methods.

Present systems rely mainly on existing pulsation dampeners to reduce pump noise and on signal processing software to counter the noise effect. The performance of the gas charged dampener depends on the pre-charge pressure value and it varies as the mud pipe pressure changes. Moreover, the known desurgers or dampeners, as found in the oilfield industry, tend to have very short throat sizes of the diameter of the flow pipes they are connected to. As furthermore the gas charge of the desurger is set without knowledge of the telemetry signal, it does not contribute efficiently towards reducing the noise in the telemetry signal band. It is often found that performance of the desurger deteriorates as the pressure increases, particularly beyond 2000 psi [13.78 MPa]. The performance of the reactive dampeners (no gas) is independent of operating pressure. However, very large physical size is required to achieve sufficient dampening. For instance, increasing the size of a reactive dampener (PPC Inc.) from 180 to 240 gallon [681 to 908 liters] results in peak-peak noise reduction from 105 to 80 psi [0.72 to 0.55 MPa].

Noise cancellation by signal processing means has been successful in many applications. However in some cases, the selection of correct parameters by experienced personnel is required to obtain optimal result. Whichever signal processing method is chosen, attenuation of noise by physical filters will make the task of further signal processing easier.

It is therefore an object of the present invention to reduce the noise level in mud pulse telemetry, particularly the noise generated by the mud pump, through mechanical filtering.

SUMMARY OF THE INVENTION

In accordance with a first aspect of the invention, a mud flow pipe system connecting a mud pump station to a drill string is modified to include at least one acoustic resonator positioned downstream of said mud pump station and at least one transducer responsive to pressure variations within said pipe system positioned downstream of said resonator, wherein said resonator is tuned to provide a band stop filter for pressure variations within said pipe system.

A pipe system is understood as an arrangement of pipes and/or hoses, preferably adapted to withstand the operating pressures of mud flow system used in hydrocarbon drilling.

A mud pump station is an arrangement of one or more mud pumps often including a desurger or dampener which station is adapted to inject drilling fluid into the drill string during drilling operations.

An acoustic resonator is a device having a frequency response curve with at least one pronounced maximum or minimum in the acoustic frequency band, particularly in the frequency band of 1 Hz to 100 Hz. The resonator of the present invention acts as a mechanical band stop filter that provides an attenuation of pressure variations within the above frequency band.

A tuned resonator is introduced into the surface mud flow system and set to a resonance frequency that creates a band stop filter within a frequency band utilized for signal transmission by a downhole drilling telemetry system, particularly by mud pulse telemetry systems. Preferably it comprises a of a pressure vessel connected to the mudflow pipeline through a inlet pipe. The vessel could be a desurger tuned to the correct resonant frequency. More preferably it is a smaller vessel with a volume of up to 0.5 or even 0.66 of the volume of the existing desurger. It absolute terms the volume of the resonator varies widely, but it can be expected to be less than 15 [57 liters] or even less than 5 gallons [19 l] for most drilling operations. The length of the inlet pipe is preferably chosen to exceed the nominal mudflow pipeline diameter by a factor of one or even two. Its diameter is preferably chosen to be smaller than 0.66 or even 0.5 of the pipeline diameter. Any gas charge used to tune the resonator can be loaded directly into the vessel or into a bladder within the vessel as in case of the gas-charged dampener/desurger.

The resonator has a resonance frequency that provide a band stop filter within a frequency band of 1 to 100, preferably 1 to 50, more preferably 5 to 30 and even more preferably 5 to 25 Hz to effectively shield the telemetry signal band from noise that is generated by the pump station.

According to another aspect of the invention, a complex acoustic filter is formed by combining a system of one or more constrictions in the mud flow system and one or more of the tuned Helmholtz resonators. The Helmholtz resonator is preferably realized as a housing with a chamber or container and a neck tube providing a flow connection between the chamber and the mud flow. By combining constrictions and resonators into a complex acoustic filter, the frequency filtering effect of the system can be suitably shaped to provide an optimal attenuation of noise using, for example, the multiple tunable resonance frequencies of such a system.

According to another aspect of the invention, the resonator can be tuned manually or automatically to compensate for drifts or changes in the nominal resonance frequency of the resonator. Such drifts occur during drilling operations due to pressure and temperature changes that are preferably monitored to provide an automatic adjustment of the resonance frequency. In a preferred variant of this aspect of the invention, the resonator is connected to a source of pressurized gas and an exhaust vent to regulate a volume of pressurized gas within the resonator.

These and other aspects of the invention will be apparent from the following detailed description of non-limitative examples and drawings.

EXAMPLES

Figure 1:
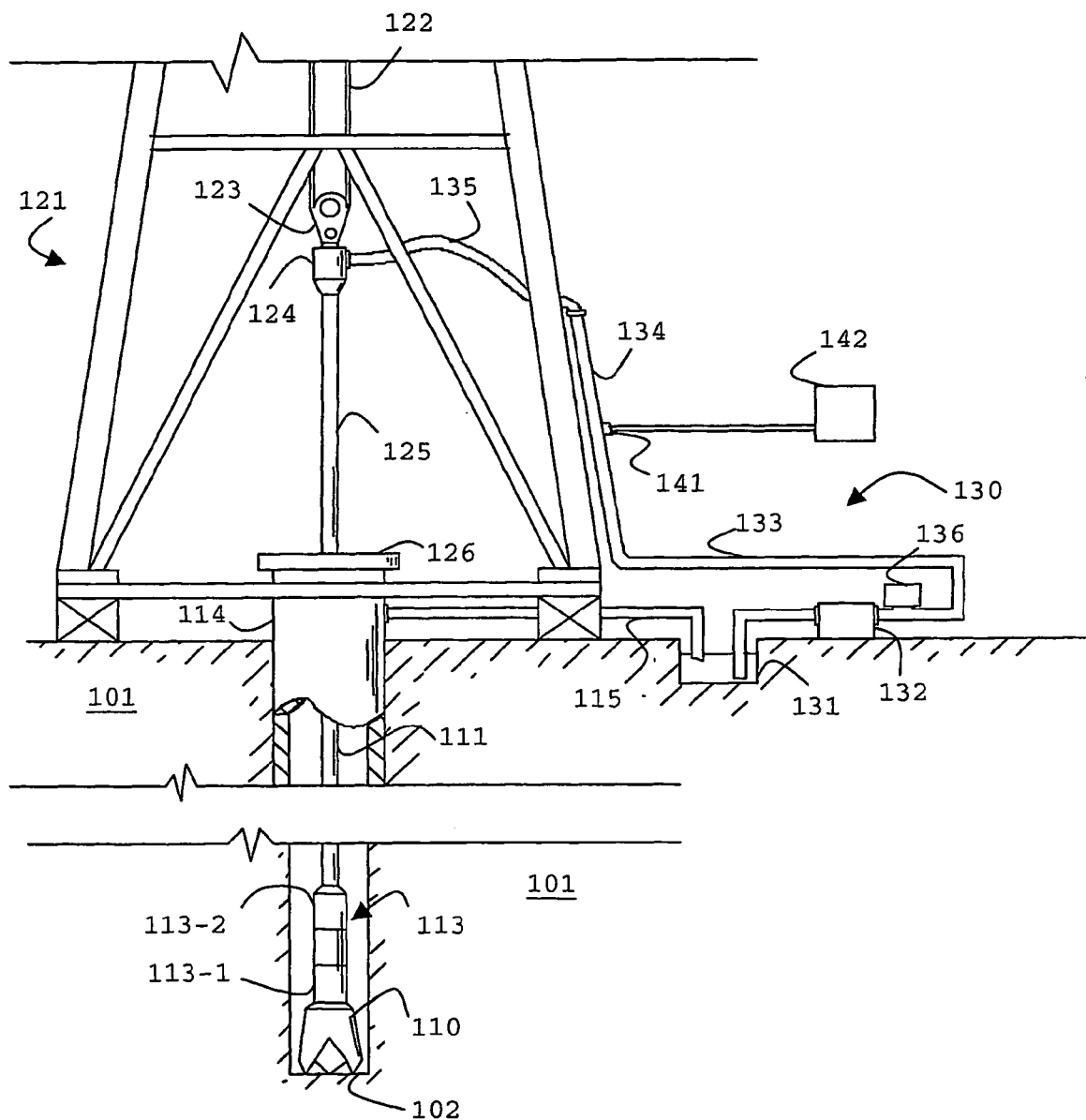
FIG. 1 shows a known system for mud pulse telemetry during drilling operations.

In FIG. 1, there is shown a known well drilling system configured for MWD operation and having a mud pulse telemetry system. Drill string 111 is shown within borehole 102. Borehole 102 is located in the earth 101. Borehole 102 is being cut by the action of drill bit 110. Drill bit 110 is disposed at the far end of bottom hole assembly (BHA) 113 that is attached to and forms the lower portion of drill string 111. Bottom hole assembly 113 contains a number of devices including Measurement-while-drilling (MWD) subassemblies 113-1 for MWD measurements. Examples of typical MWD measurements include direction, inclination, survey data, downhole pressure (inside and outside drill pipe), resistivity, density, and porosity. The signals from the MWD subassemblies are transmitted to mud siren or pulser assembly 113-2. Mud siren assembly 113-2 converts the signals from subassemblies 113-1 into pressure pulses in the drilling fluid. The pressure pulses are generated in a particular pattern which represents the data from subassemblies 113-1. The pressure pulses are either positive (increases in pressure) or negative (decreases in pressure) or a combination of positive and negative pressure pulses in form of a carrier wave modulated by data signals. The pressure pulses travel upwards though the drilling fluid in the central opening of drill string 111 and towards the surface system. Subassemblies 113-1 can also include a turbine or motor for providing power for rotating drill bit 110 and, thus, provide means for controlling the borehole trajectory.

The drilling surface system includes a derrick 121 and hoisting system, a rotating system, and a mud circulation system 130. The hoisting system which suspends the drill string 111, includes draw works 122, hook 123 and swivel 124. The rotating system includes kelly 125, rotary table 126, and engines (not shown). The rotating system imparts a rotational force on the drill string 111 as is well known in the art.

The mud circulation system 130 pumps drilling fluid down the central opening in the drill string 111. The drilling fluid is often called mud, and it is typically a mixture of water or diesel fuel, special clays, and other chemicals. The drilling mud is stored in mud pit 131. The drilling mud is drawn in to mud pumps 132 which pumps the mud though surface pipe system 133, stand pipe 134, kelly hose 135, and swivel 124, which contains a rotating seal, into kelly 125 and drill pipe 111. Positioned close to the outlet of mud pumps 132 is pulsation dampener or desurger 136. Desurger 136 is provided to reduce pump wear by reducing the fluctuations in pressure within the mud circulation system. It typically consists of a gas-pressurized bladder inside a rigid housing.

The mud passes through drill string 111 and through drill bit 110. As the teeth of the drill bit-grind and gouges the earth formation into cuttings the mud is ejected out of openings or nozzles in the bit with great speed and pressure. These jets of mud lift the cuttings off the bottom of the hole and away from the bit, and up towards the surface in the annular space between drill string 111 and the wall of borehole 102. At the surface the mud and cuttings leave the well through a side outlet in blowout preventer 114 and through mud return line 115. Blowout preventer 114 comprises a pressure control device and a rotary seal. From a cuttings separator (not shown) the mud is returned to mud pit 131 for storage and re-use.

The mud pulse signals generated by mud siren 113-2 are transmitted through the mud column inside drill string 111 back into surface mud pipe system. Usually one or more stand pipe pressure monitors (SPMs) 141 are used to detect these pressure pulses or variations in the drilling fluid. Control unit 142 decodes the pressure fluctuations back into the parameters measured by the MWD equipment 113-1. As the pressure pulse are severely attenuated and distorted by the transmission process and the noise inherently generated during drilling operations, control unit 142 includes signal processing capability to at least partly restore or interpret the original signals. MWD parameters thus transmitted assist the operator in drilling the borehole 102 and evaluating the earth formation 101 surrounding it.

Although a system with a kelly 125 and rotary table 126 is shown in FIG. 1, similar arrangements for MWD transmission and detection are used in top drive drilling derricks.

Although the drilling system is shown as being on land, it is applicable to marine and transitions zone environments.

Figure 2:
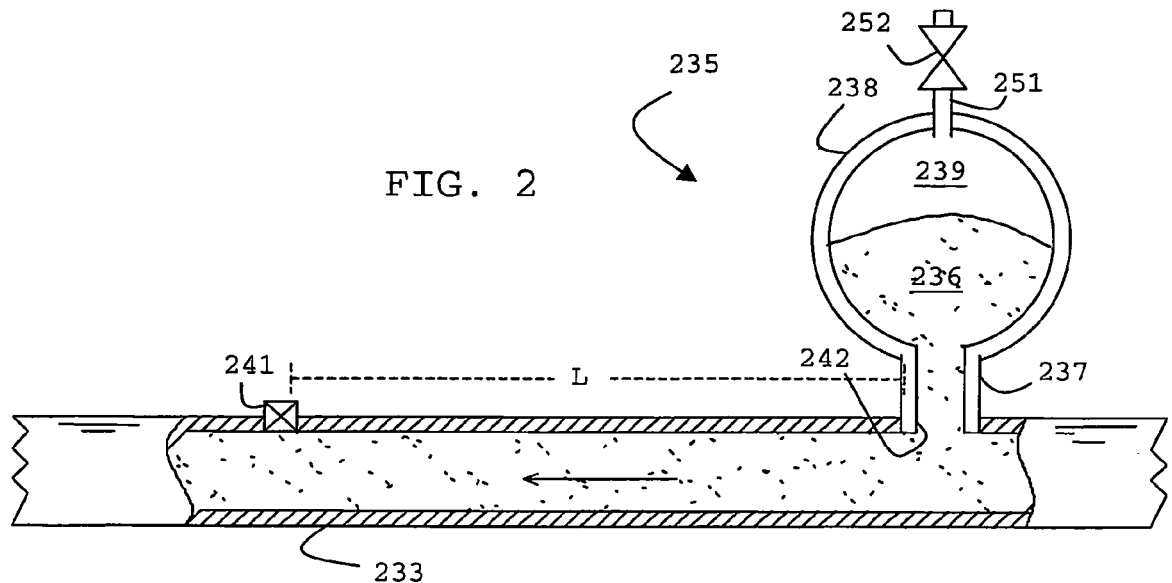
FIG. 2 shows a tuned resonator in a surface mud flow system in accordance with an example of the invention.

In FIG. 2 there is shown a schematic section of the mud circulation 130 as illustrated above. Making reference to FIG. 1, the section shown in FIG. 2 is located within surface pipe system 133 downstream of pumps 132 and desurger 136, but upstream of stand pipe 134. Here and throughout the description the terms "downstream" and "upstream" are used in relation to the flow direction of the mud that starts at pumps 132. From there the mud is forced through surface pipe system 133 into the drill string 111 to return through borehole 102, and return pipe 115 to the mud pit 131. In FIG. 2 and other figures referred to below arrows indicate this flow direction.

According to first example of an embodiment of the invention, at least one tuned mechanical resonator (TMR) 235 is inserted into surface pipe section 233. The TMR 235 of FIG. 2 is positioned within the horizontal section of the surface pipe section preferably upstream of the stand pipe. It consists of an elastically suspended mass in a force- or pressure-transmitting connection with the inner of surface pipe 233. In the example of FIG. 2, the mass is provided by fluid 236 entering through inlet pipe 237, the "neck pipe", into the pressure-sealed inner volume of housing or container 238. An elastic force is provided from within container 238 by a pressurized fluid charge 239. Inlet and exhaust pipe 251 with valve 252 provide an opening for fluid charging, release and pressure adjustment. One MWD pressure sensor 241 is shown at distance L downstream of TMR 235.

When describing the operation of TMR 235 by means of a mathematical model, the resonator can be modeled as a Helmholtz resonator having an acoustic capacitor and inductor coupled in series, similar to an L-C resonator in electrical systems.

For a gas-charged resonator—preferred for implementing the capacitor—the acoustic capacitance is given by $$C=(V_m/\rho_m)(1/C_m)^2+(V_g/\rho_g)(1/C_g)^2 \quad [1]$$

where $v_m$, $\rho_m$, $c_m$, are the volume, density and velocity of sound for mud in the resonator, $v_g$, $\rho_g$ and $c_g$, those for gas in the resonator. Since the density and velocity of sound for gas is much smaller than those of mud under normal surface pipe pressure, the contribution by the gas volume is effectively amplified by a factor of $(\rho_m/\rho_g)(c_m/c_g)^2$, thus the second term in equation [1] is much larger than the first. This makes gas-charged resonators more effective than containers filled only with liquids. It is worth noting at this point that the volumes, densities and velocities of sound change with operating pressure and temperature. Methods and apparatus to compensate for this behavior are the object of further variants of the invention to be described below.

The acoustic inductor is related to the liquid mass 236 in the inlet tube or neck section 237 that connects TMR 235 to the surface mud pipe 233. The acoustic inductance or inertance is given by:

$$M=\rho_m h'/S_n \quad [2]$$

Where $S_n$ is the cross-sectional area of neck 237 and h' is the effective neck length which can be approximated by the geometrical length, h, if h is much larger than the radius of neck 237.

The resonance frequency of the Helmholtz resonator is thus given by:

$$w_0=(MC)^{-1/2} \quad [3]$$

There is always a resistive loss associated with the resonator system. For instance the thermo-viscous resistance can be written as:

$$R_w=(2\rho_m\eta w)^{1/2}h'/(r_n S_n)$$

Where $r_n$ is the radius of the neck, $\eta$ the mud viscosity and w the frequency. Considering only the thermo-viscous loss, then the Q factor of the resonator is given by:

$$Q=w_0 M/R_w \quad [5]$$

According to the above model the TMR 235 acts as a band stop filter within a frequency band around $w_0$ and a bandwidth that is determined by the Q factor. Within this band, noise is more or less effectively absorbed.

For the working of the present invention the installation of neck tube 237 does not have to be upright as shown in FIG. 2. In may cases it may be more advantageous to guide it first horizontally to the location of the resonator container, which could be placed alongside the mud pipe. To enter vertically through the bottom of the container, the neck tube can then be bent upward at its distal end.

In the example of FIG. 2, inlet tube 237 of TMR 235 is connected to the mud pipe 233 through taping hole 242 in the wall of pipe 233. This installation method is similar to the one used for installing surface pressure receivers 241 for mud pulse telemetry. It is a method that can be used in applications of the inventions where larger openings into the mud line are not acceptable due to operating conditions or safety concerns. This stop band filter installation causes no significant pressure drop because the filter is non-intrusive to the main flow line, but branches out from it. However, with such a direct branch type installation, pressure transducer 241 are preferably mounted downstream from TMR 235 at a distance L that essentially equivalent to a quarter-wavelength of the main signal frequency of the telemetry system to avoid attenuation of the signal in the vicinity of the resonator. Multiple receivers may be needed to cover different quarter-wavelength positions for different signal frequencies. In the present example, transducer 241 is placed at a distance L of 28 meters downstream of the TMR 235 while a second transducer (not shown) may be placed at 14 meters from the filter to cover 12 Hz and 24 Hz signal frequencies, respectively.

Whilst the configuration of FIG. 2 above may result in a satisfactory level of noise reduction with a minimum of change to existing operations and equipment of existing mud flow systems, it was found to be beneficial to make more changes to the existing surface mud flow system in order to increase the efficiency of resonators in accordance with the present invention.

According to a second embodiment of the invention, the above-described resonator or resonator system is employed in combination with one or more constriction elements within the mud flow pipe to provide a complex mechanical filter (CMF).

Figure 3:
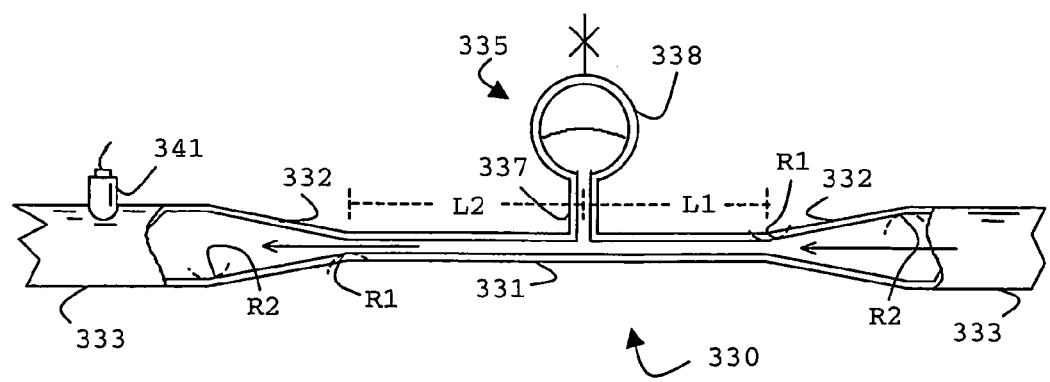
FIG. 3 shows an arrangement of a tuned resonator and a Venturi-type flow constriction in accordance with an example of the invention.

Accordingly, there is shown in FIG. 3 an example of a preferred variant of the invention including a Venturi constriction section 330 and at least one TMR 335 in close vicinity.

A Venturi constriction is designed to provide gradual and smooth transition from existing surface pipe to a pipe of smaller diameter, thus reducing flow related pressure drop. The pressure loss coefficient for Venturi constriction is typically between 0.98 and 0.99. This compares favorably to a value between 0.6 and 0.7 for a device that has a simple orifice as flow constriction. Venturi constriction 330 consists of a section of pipe, referred to as "throat" 331, which has a diameter, $D_v$, smaller than the diameter of the surface mud pipe 333, $D_s$, and two cone-shaped transitional sections 332, one convergent and one divergent. The parameters such as the respective (transition) lengths $L_f$ and $L_r$ of the upstream and downstream transitional sections 332, the contraction ratio $D_v/D_s$ and the value of the radii R1 and R2 which join cone-shaped sections 332 to the straight pipe sections 331, 333, can be optimized according to standard Venturi flowmeter design to minimize pressure loss. The contraction ratio $D_v/D_s$ has significant effect on acoustic noise, and so has the total length of the throat, $L_t=L1+L2$. A smaller $D_v/D_s$ ratio or a longer $L_t$ results in greater noise attenuation, but on the other hand increases the pressure drop, particularly for highly viscous mud. The contraction ratio can range from 0.1 to 0.8 although a value between 0.35 and 0.6 is preferable. The throat length $L_t$ can range from less than a meter to tens of meters. The pipe for the throat section does not have to be rigid and straight. Therefore flexible hose pipe may be used if installation space is limited.

In FIG. 3, at least one TMR 335 is mounted equidistant to both cone sections of the Venturi at the throat section of the Venturi constriction. However, the mounting position does not have to satisfy the condition L1=L2.

Figure 4:
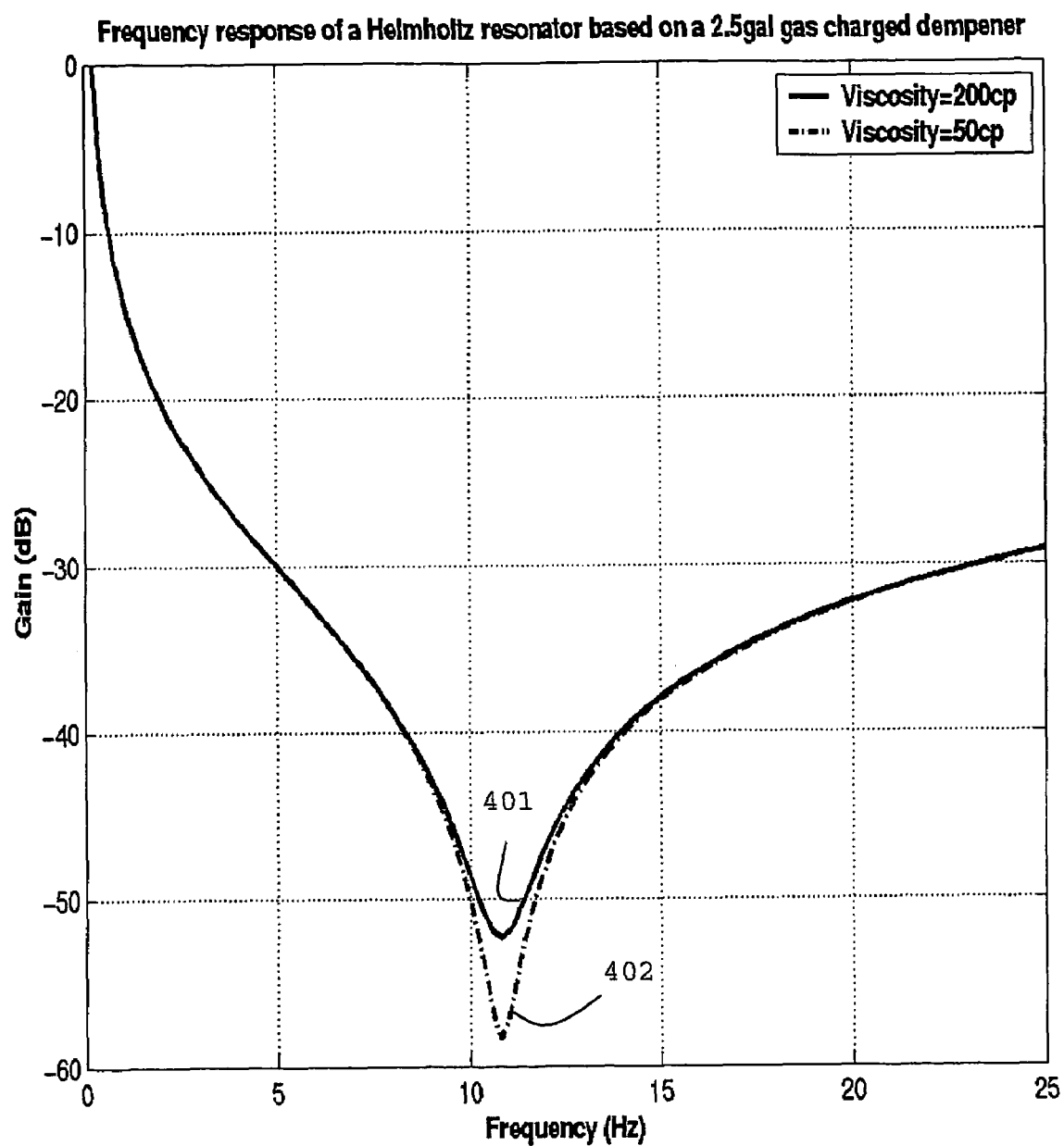
FIG. 4 is a plot of the frequency response of the normalized acoustic impedance of a Helmholtz resonator based on a gas charged dampener.

The mechanical filter system shown in FIG. 3 acts as a band stop filter with its resonance frequency tuned to the frequency of the mud siren frequency, which could be 12 Hz or 24 Hz. TMR 335 is a 2.5 gallon [9.5 l] container 338 precharged to 0.55 of 2000 psi [13.78 MPa] working pressure of the mud flow system with neck tube 337 having a 1.25 inch [3.18 cm] inner diameter and a length of 0.5 m. Thus, the resonator is tuned to approximately 11 Hz. Its frequency response of the normalized acoustic impedance is illustrated with the plot of FIG. 4 for mud fluids of 200 cP (curve 401) and 50 cP (curve 402), respectively. Both curves 401, 402 show attenuations close to −55 dB at 11 Hz.

Figure 5:
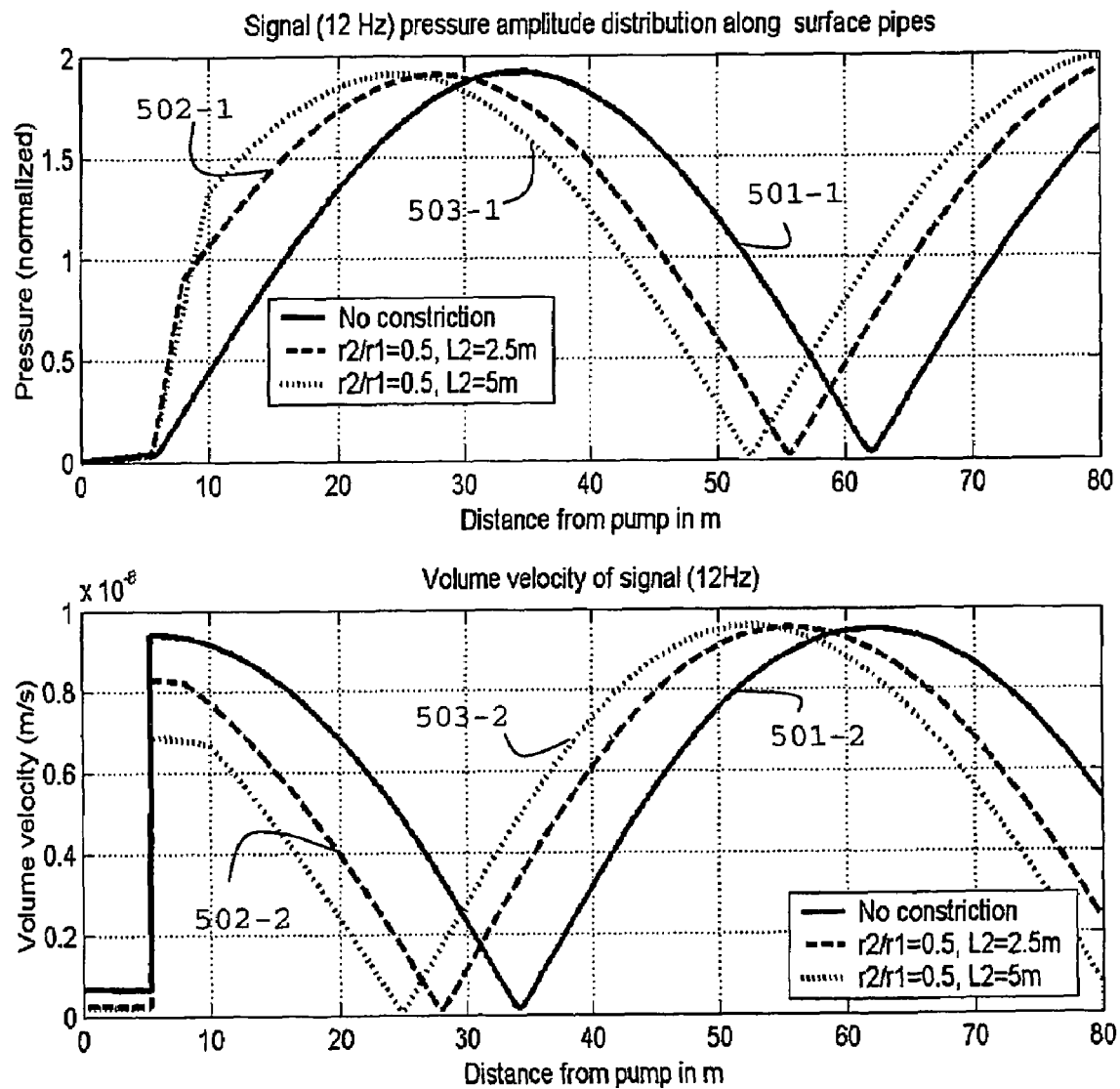
FIG. 5 shows the graphs of the signal strength distribution along the surface section of the mud flow system for three different configurations.

A constriction section 330 as shown in FIG. 3 has the additional effect of producing a more uniform signal strength distribution along the surface section of the mud flow system where receivers 341 are likely to be mounted. This effect is demonstrated in the two plots of FIG. 5 that show the (normalized) pressure signal strength and volume velocity, respectively, for three different configurations. If there is no constriction present in the filter system (as in the example of FIG. 2 above and illustrated by curves 501-1, 501-2), the receiver should be mounted about 28 meters downstream from the resonator to get the maximum signal amplitude for a 12 Hz signal. The resonator, in turn, is located at 6 meters from the pump equipment. In practice this configuration may not always be feasible. Particularly when the signal frequency changes, fixed receiver positions may become non-ideal. Introducing a constriction, particularly one with a long length L2 downstream of the resonator (as shown in FIG. 3), raises the signal strength in regions close to the complex filter system that includes constriction and TMR. Curves 502-1, 502-2 illustrate the effect of a complex filter system including a constriction with a contraction ratio of 0.5 where the downstream length L2 of the throat section equals 2.5 m. For curves 503-1, 503-2 the downstream length L2 is extended to 5 m. As above, the complex band stop filter system is positioned about 6 meters from the pump equipment. Under such circumstances, pressure transducers 341 can be mounted close to the end of constriction 330 and still remain exposed to sufficient signal strength. Also, in the vicinity of the constriction the signal strength fluctuations are to a large extent independent of the signal frequency.

Figure 6:
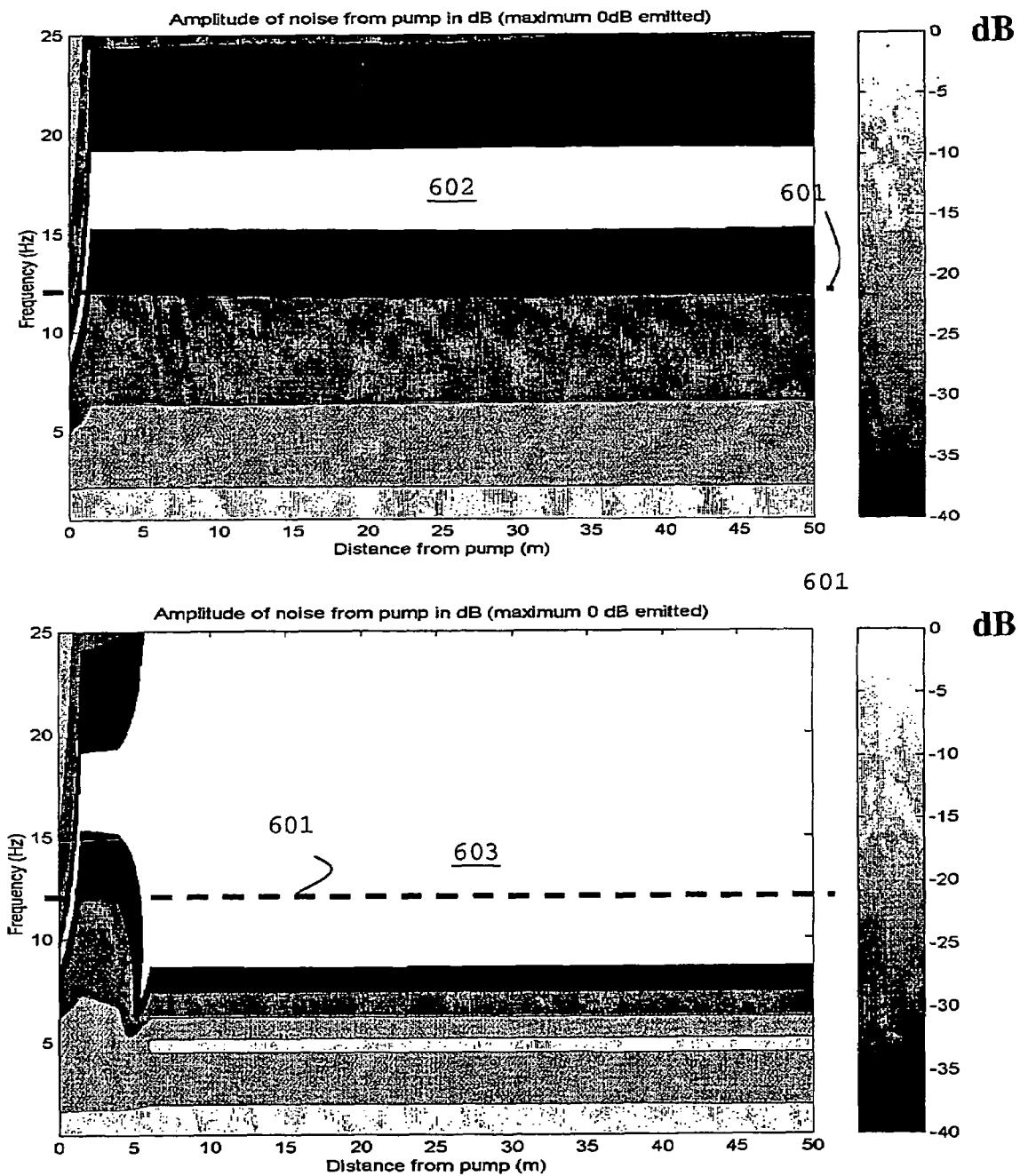
FIG. 6 shows two frequency-distance contour plots to illustrate the noise filtering performance of an arrangement in accordance with the invention.

The complex filter system including tuned resonator 335 and Venturi constriction 330 as shown in FIG. 3 can be simulated by using a linear plane wave model. The noise-suppressing effect of such an in-line filter is illustrated by the simulated frequency-distance contour plots of FIG. 6. The spectral gray level distribution in FIG. 6 indicates the amount of attenuation of the pump noise with attenuation increasing as the gray-level changes from light region to dark as function of the frequency (y-axis) and distance from the pump (x-axis). The stop band, however, corresponding to the region of highest attenuation, is depicted as a white zone. The upper image shows the noise pressure distribution of a system with an existing desurger that is not tuned to the signal frequency. Its volume is 20 gallons [76 l] and it is assumed to be pre-charged at 30 percent of a working pressure of 2000 psi [13.78 MPa]. This is calculated to result in a resonance at 17 Hz. In this case the carrier frequency of the signal shown as dashed line 601 at 12 Hz falls outside stop band 602. The lower image shows the effect of adding a filter system with a pipe diameter contraction ratio of 0.35, and L1=L2=1 m and a Helmholtz resonator tuned to 11 Hz. The stop band 603 now covers the signal band 601.

A further effect of the filter is illustrated in FIG. 7. In the example, the combined effect is shown of a tuned resonator in accordance with the present invention and a conventional desurger of the type usually attached to the pump system in order to dampen pressure fluctuations.

Figure 7A:
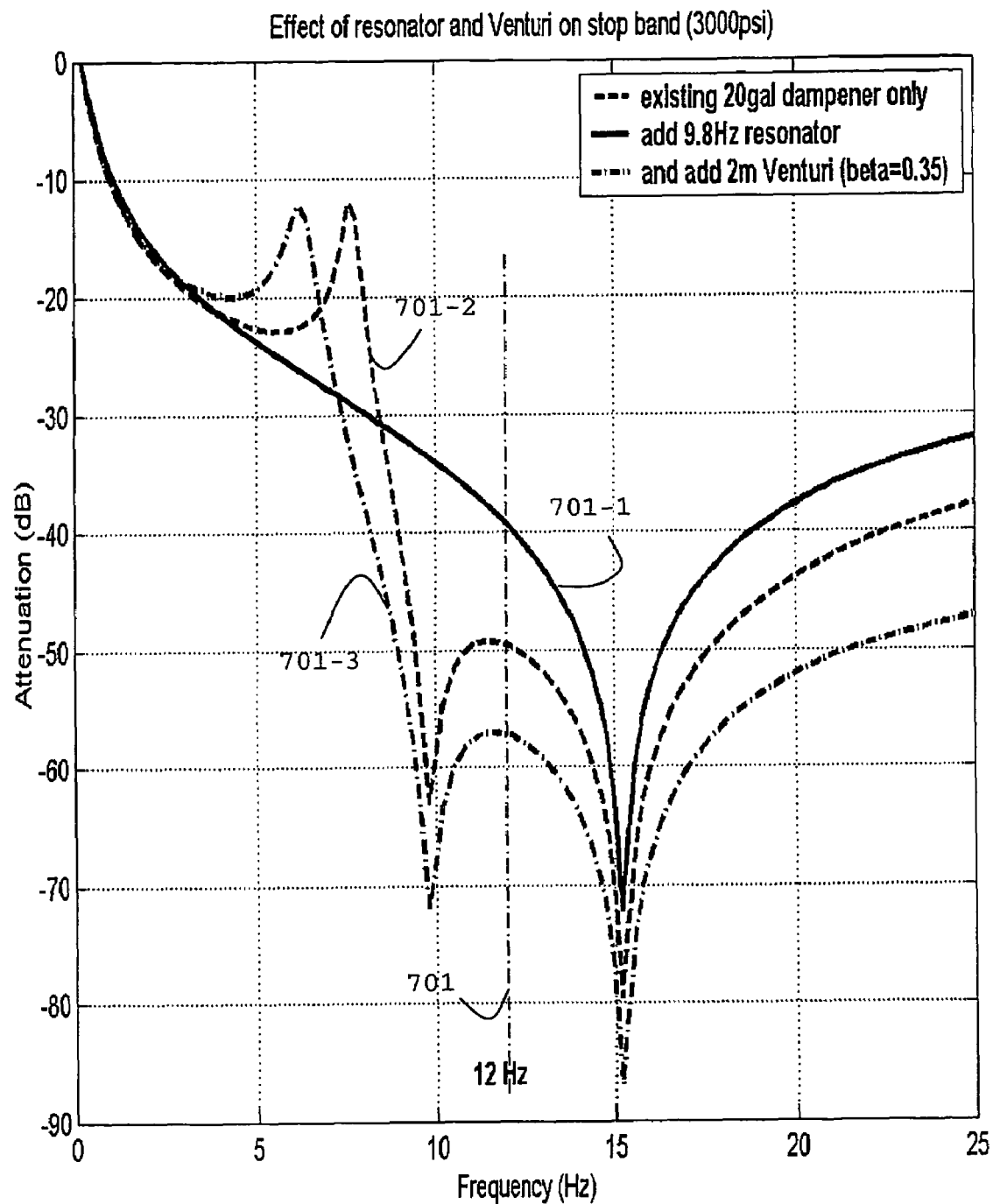
FIGS. 7A,B show the filter effect of a tuned resonator or complex filter system in combination with a desurger close to the mud pump.

In FIG. 7A, three curves 701-1,2,3 illustrate the frequency response of a surface pipe system in three different configurations. Curve 701-1 is the response of a system with a conventional desurger of 20 gallons [76 l] volume. The desurger is modeled to have a resonance around 15 Hz. Curve 701-2 is the same system with an additional TMR tuned to 9.8 Hz. The resulting attenuation to noise at the signal frequency (12 Hz) is about 10 dB. By adding a Venturi constriction with the total length of the throat $L_t$ of 2 m and a contraction ratio of 0.35, the attenuation is further increased (curve 703-1). Vertical dashed line 701 indicates the frequency band of the telemetry signal at 12 Hz.

Figure 7B:
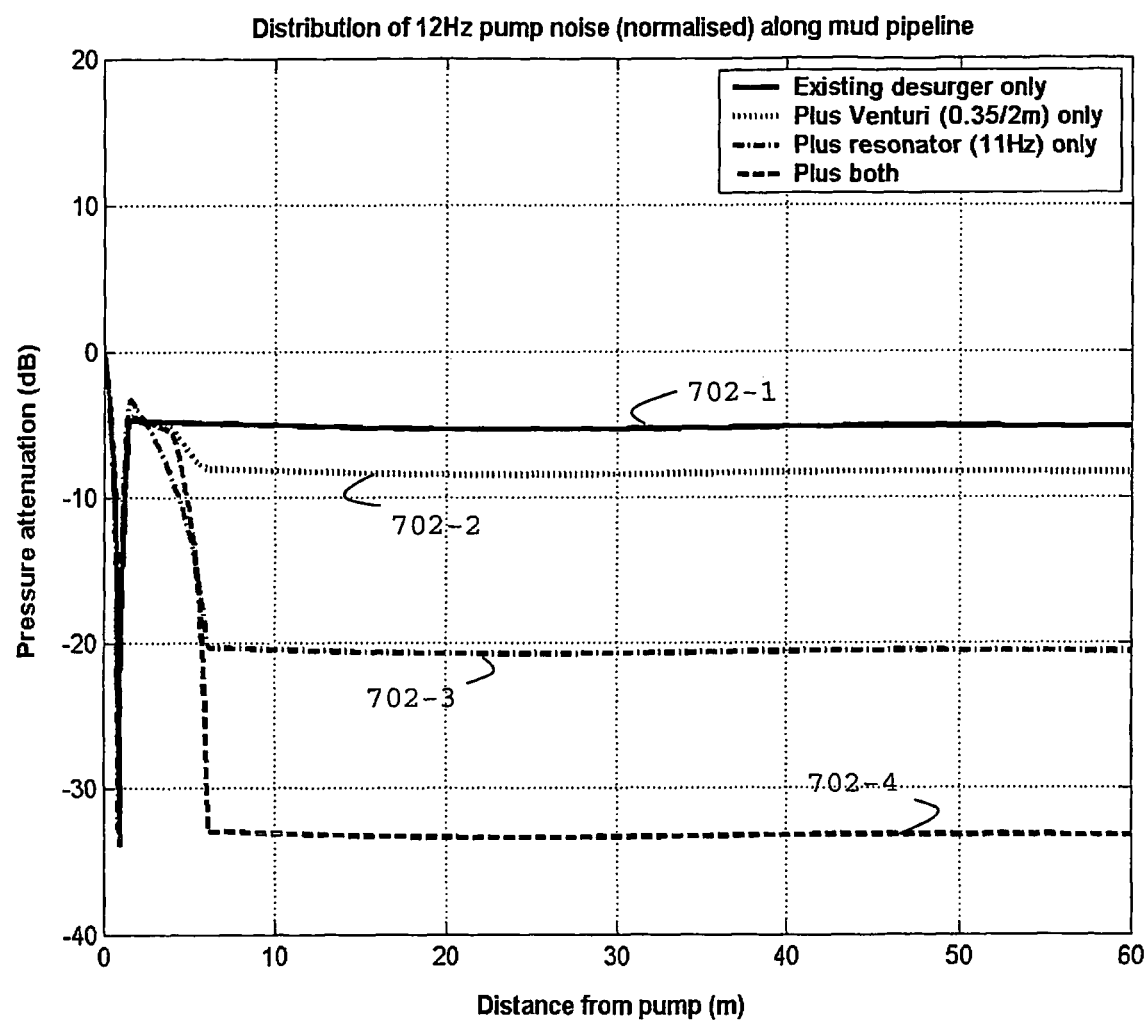

The amplitude distribution of the pump noise pressure (at 12 Hz and normalized by the pressure at the pump) along the surface pipe is shown in FIG. 7B for four different configurations. Solid line 702-1, illustrates the performance of a system with a 20 gallons [76 l] dampener with a pre-charge ratio of 0.3 at a working pressure of 2000 psi [13.78 MPa]. The effect on the pump noise is about −5 dB at any position beyond its location (6 m from the pump) at which the attenuation has a spike. Adding a Venturi constriction as illustrated by curve 702-2 improves the performance of the desurger marginally to about −8 dB. Significant improvement is achieved only when combining the existing dampener with a properly tuned TMR. As curve 702-3 shows, such a combination can result in an overall attenuation of 20 dB. Curve 702-4 shows the attenuation of a system where the TMR of curve 702-3 is replaced by a complex filter system, i.e., a TMR in combination with a Venturi constriction. In this configuration, the attenuation increases by about another 12 dB.

Thus, an existing desurger, particularly when having a resonance frequency close to the signal band, can have reinforcing impact on the efficiency of a TMR system. However tuning is possible only within the limits set by the dimensions (volume, diameter and length of the neck pipe, etc.) of the existing desurger and further requires the knowledge of frequency of the telemetry signal.

Whereas in the examples described above, the resonance frequency is set prior to drilling operations by pre-charging the resonator volume and/or desurger to a given pressure, it may be advantageous to perform a tuning of the resonator in response to changing external parameters.

For a given resonator volume or container size, the tuning is preferably done by selecting the ratio of the pre-charging pressure to the operating pressure or by changing the length or cross-sectional area of the connecting tube ("neck"). Such tuning procedures will be described in the following part of the description.

During a drilling job, there are at least two parameters that may vary during the operation: pressure and, to a lesser extent, the temperature of the mud. The changing conditions will influence the parameters in equations [1] and [2] above, and consequently will change the resonance frequency of the Helmholtz resonators. The pressure change in particular will influence the gas density and volume in the dampener most significantly. Since the volume/density ratio of gas dominates the capacitive element defined by equation [1], the effect of pressure change requires compensation in order to maintain the correct resonance frequency under all operating pressures.

A method for automatically compensating the pressure and temperature effects is described in the following.

Assuming a dampener volume $V_0$ and a pre-charge ratio of x, the gas volume in the dampener at the minimum working pressure, $P_1$, is:

$$V_1 = xV_0 T_1/T_0 \qquad [6]$$

where x is the ratio of the pre-charge pressure to the minimum working pressure, $T_0$ and $T_1$ are the temperatures at the pre-charge and at the minimum working pressure. As the pressure increases from $P_1$, say, to $P_2$, the gas volume is compressed to:

$$V_2 = V_1(P_1 T_2)/(P_2 T_1) \qquad [7]$$

where $T_2$ is the new temperature. The density of the gas at $P_2$ and $T_2$ is:

$$\rho_2 = P_2/(RT_2) \qquad [8]$$

where R is the gas constant. The ratio of $V_2$ over $\rho_2$, which is given by $$V_2/\rho_2 = (P_1/T_1)RV_1(T_2/P_2)^2, \qquad [9]$$

is inversely proportional to $(P_2)^2$. In cases where the pressure change is significant and the temperature change is small, an increase in the operating pressure causes the capacitance of the resonator to drop (see equation [1]) and the resonance to shift to higher frequency. In order to maintain a constant resonance frequency, the ratio of V over ρ needs to be kept constant ignoring the temperature effect on $C_g$ and on the first term in equation [1].

According to the present example an additional volume, DV, of gas is charged under the new pressure into the dampener to compensate for the changes, hence:

$$(DV+V_2)/\rho_2 = V_1/\rho_1 \qquad [10]$$

Combining equations [7], [8] and [10], yields $$DV = [(R_P/R_T)-(R_T/R_P)]V_1 \qquad [11]$$

where $R_P = P_2/P_1$ and $R_T = T_2/T_1$ are the operating pressure and temperature range ratios.

For a 2.5 gal [9.5 l] resonator with pre-charging ratio of 0.45, the gas volume, $V_1$, at a minimum working pressure of 1000 psi [6.89 MPa] and under constant temperature is about 1.13 gal [4.28 l]. If the operating pressure of the surface pipe rises to 2000 psi [13.78 MPa] and no compensation is used, then the gas volume under the new pressure shrinks to 0.56 gal [2.14 l] (equation [7]). To compensate for the resonator's capacitance change, a DV of 1.69 gal [6.4 l] is needed according to equation [11]. After charging the 1.69 gal [6.4 l] of gas into the dampener under the new pressure of 2000 psi [13.78 MPa], the new total gas volume in the dampener becomes 2.25 gal [8.52 l] and the resonance frequency is maintained. Obviously the volume of the resonator's housing has to be sufficiently large to accommodate the compensating volume, DV. The selection of a suitably large housing depends on the frequency of the telemetry signal carrier and the operating pressure range. For carrier frequencies at the upper range of modern telemetry equipment, i.e. 12 Hz and 24 Hz, and for operations with moderate pressure range, a 2.5 gal [9.5 l] dampener would be often satisfactory.

For operations with very high minimum pressure ($P_1 > 2500$ psi [17.23 MPa]) and wide pressure range ($R_P > 2$), a larger resonator volume, e.g. a 5 gal [19 l] volume, may have to be used to provide the volume adjustment range.

Figure 8A:
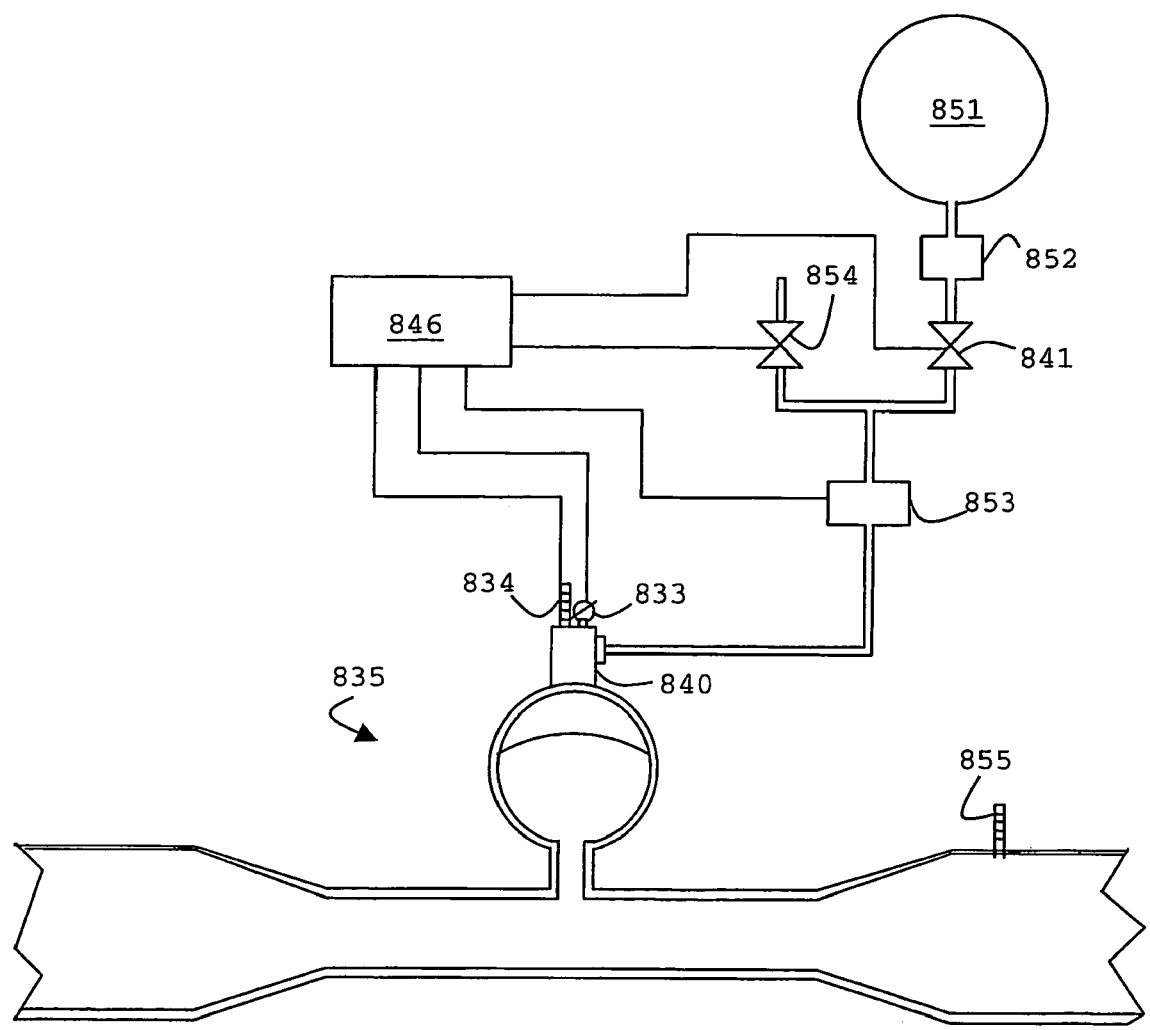
FIG. 8A is a schematic diagram of an automatically adjusting resonator in accordance with an example of the invention.
Figure 8B:
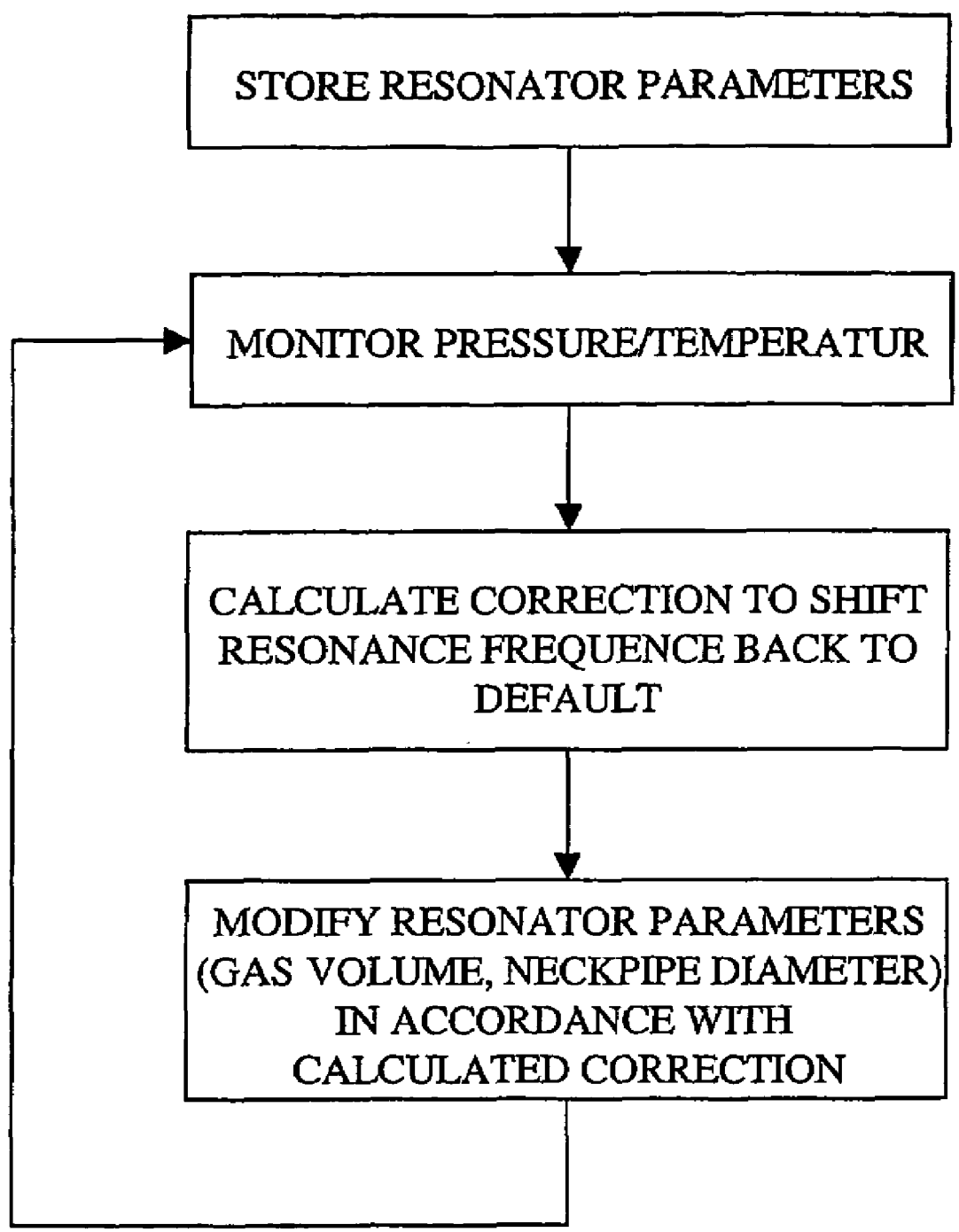
FIG. 8B is a block diagram of steps of tuning/compensation method in accordance with an example of the invention.

The compensation method described above can be implemented manually or automatically. An automatic tuning/compensation method is illustrated schematically in FIG. 8, in which FIG. 8A is a diagram of components of the system and FIG. 8B is a block diagram of steps taken in accordance with the method.

The pressure and temperature of the gas inside TMR 835 is monitored by pressure transducer 833 and temperature transducer 834. The measured values are input to TMR control unit 846, which may be part of the surface processing module for mud pulse telemetry. Unit 846 calculates the compensation volume, DV, by using equations [11] and [7], from the measured P and T inputs as well as pre-recorded parameters such as the resonator volume, $V_0$, the pre-charging ratio x, the gas temperature at pre-charge, $T_0$, and the gas temperature $T_1$ at the minimum operating pressure $P_1$. After calculating DV, TMR control unit 846 opens the charging valve 841 so that gas from the nitrogen bottle 851 flows through pressure dropping regulator 852, charging valve 841 and gas flow meter 853 into the gas entry port 840 of TMR 835. The real time gas flow rate signal, Q(t), measured by gas flow meter 853 is input to the TMR control unit 846, which performs an integration versus time to produce the cumulative gas volume flow:

$$DV(t) = (P_m/P_2) \int_0^t Q(t) dt \qquad [12]$$

where $P_m$ is the pressure at flow meter 853 if it is different from that in the container, $P_2$. Once DV(t) reaches DV at time t=t1, charging valve 841 is closed and the compensation cycle for the new pressure is completed, until significant change in pressure or temperature requires its re-activation.

In case of a drop in the operating pressure, the TMR control unit can open the vent valve 854 to reduce the gas volume in TMR 835. An appropriate DV is determined from the measured pressure and temperature. The gas vented through (bi-directional) flow meter 853 is monitored by TMR control unit 846. When the accumulated gas flow reaches DV, the vent valve 854 is closed.

Temperature effects on the sound velocities in gas and in mud and on the mud volume/density ratio (the first term in equation [1]), can also be compensated for, if necessary, by adjusting the volume of the gas charge in TMR 835. A second temperature sensor 855 mounted in the surface mud pipe as shown in FIG. 8 can be used to measure the mud temperature. Theoretical or experimental temperature responses for sound velocity and density of the appropriate mud can be used to calculate the equivalent gas volume, which is needed for compensating the capacitance defined by equation [1]. Such data are readily available from the various mud operators or can be measured using well-established methods.

The gas charging compensation method can also be applied to the existing desurger mounted close to the pump. The desired frequency can be achieved and maintained if the volume of the desurger, its pre-charging pressure and the dimensions of the inlet of the desurger are known. If not ascertainable through calculations, the inductance of the inlet may be determined through experiments, either in-situ or off-line on a similar installation. For example, the resonance frequency can be measured by applying an appropriate pressure disturbance (e.g. sweeping frequency source, pulse source, or pump noise at appropriate stroke rates, e.g. continuously varying the stroke rate to generate a chirp noise). Then the inductance, M, can be determined using equation [3] by using the measured resonance frequency and the capacitance value, C, which is given by the volume of the desurger, the working pressure and the pre-charging ratio, x.

Figure 9:
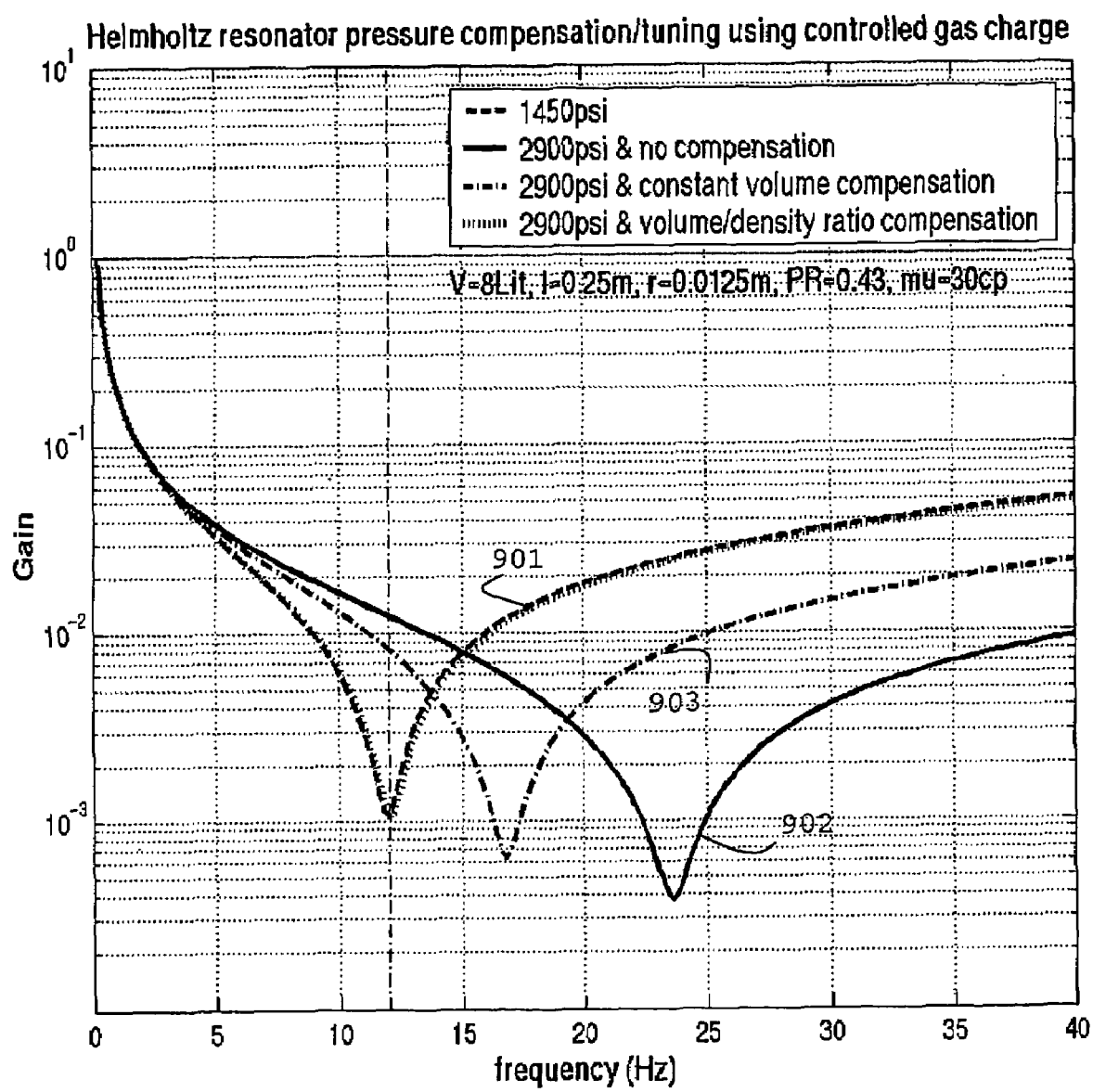
FIG. 9 is a plot of the frequency response curves for adjusted tuned resonators compared to the response curve of non-adjusted resonator at varying operating pressure.

The drifts in the response curve of an uncompensated tuned mechanical resonator compared to a gas volume ($V_g$) compensated TMR are shown in FIG. 9. As the operating pressure in the mud flow system doubles from 1450 psi to 2900 psi [9.99 to 19.98 MPa] original frequency response curve 901 changes to curve 902 and the resonance frequency shifts from 12 Hz to 24 Hz. Maintaining a constant gas volume in the resonator, the resonance frequency can be held at an intermediate value of 16 Hz (curve 903) Maintaining a constant gas volume/density ratio stabilizes the frequency response at its original value 12 Hz (curve 901). For this plot, the temperature is assumed to be constant.

Figure 10A:
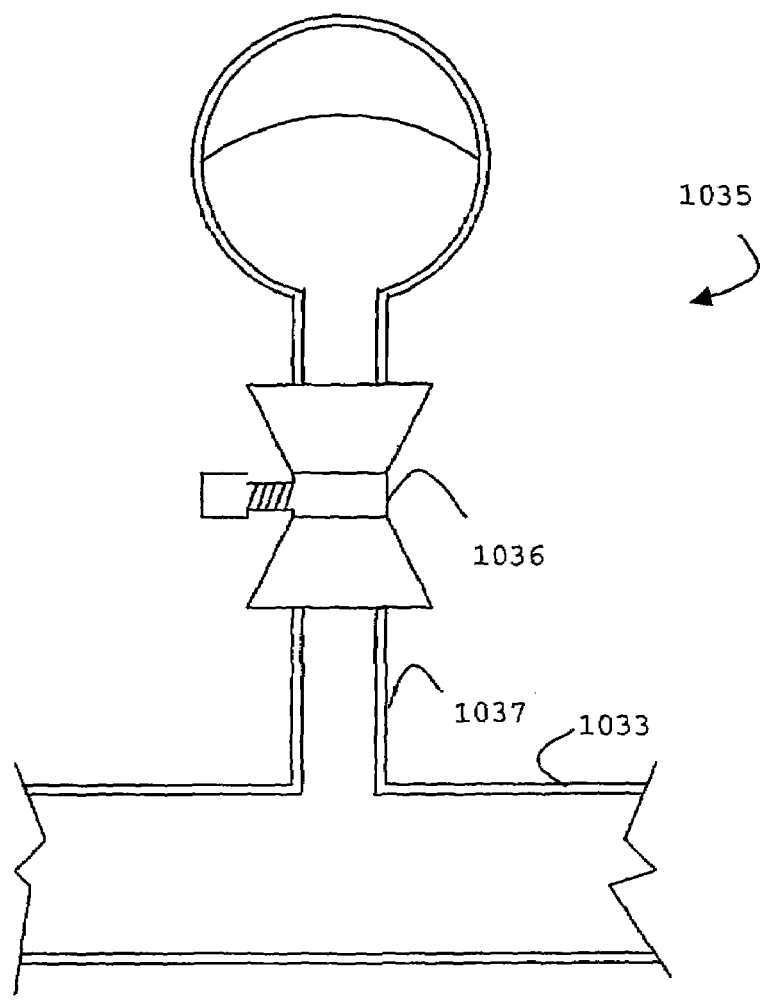
FIGS. 10A,B show further variants of adjustable resonator configurations in accordance with examples of the invention.

A different tuning method of TMR 1035 and its implementation is shown in FIG. 10. In FIG. 10A, the frequency of resonator 1035 is tuned by adjusting the opening of control valve 1036 and hence the effective cross-section of neck pipe 1037 connecting TMR 1035 to mud flow pipe 1033. This, in turn, effectively changes the inductance (inertance) value of the resonator. The correlation between the inductance value and the valve position can be obtained through experiments.

Figure 10B:
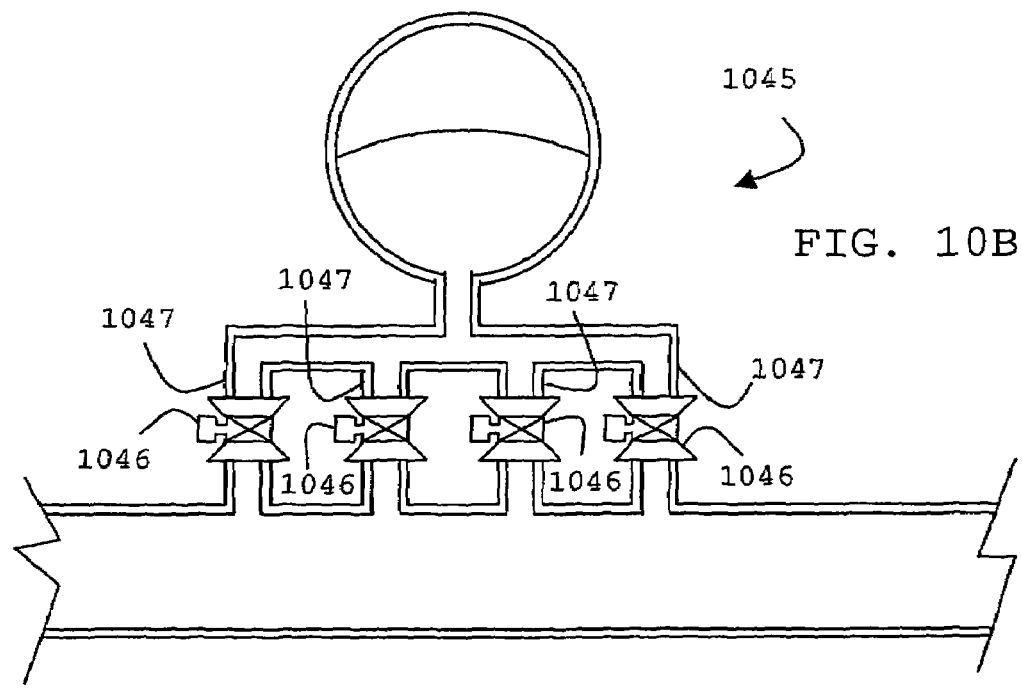

In FIG. 10B, resonator 1045 is shown having an inlet including N(=4) tubes 1047 with different or equal diameters and/or lengths. In this example, the effective cross-section of inlet 1047 of the resonator is variable through on-off bi-state valves 1046 implementing an N-bit binary array. A number of $2^N$ different combinational inductance values can be achieved by opening appropriate valves 1046. With this digital control method, a discrete number of inductance values can be obtained. A 4-tube system as shown provides 16 values if the all-closed state is counted as special case of infinite resistance. Selection of appropriate diameters and lengths for the N tubes determines the range covered by these values.

The examples given above can be varied and combined to further enhance the efficiency of the noise filtering. Such variations of the in-line TMR filter system include using several Venturi-shaped constriction sections in series, providing multiple cross-section variations along the flow line to attenuate noise, and/or multiple tuned resonators.

Figure 11A:
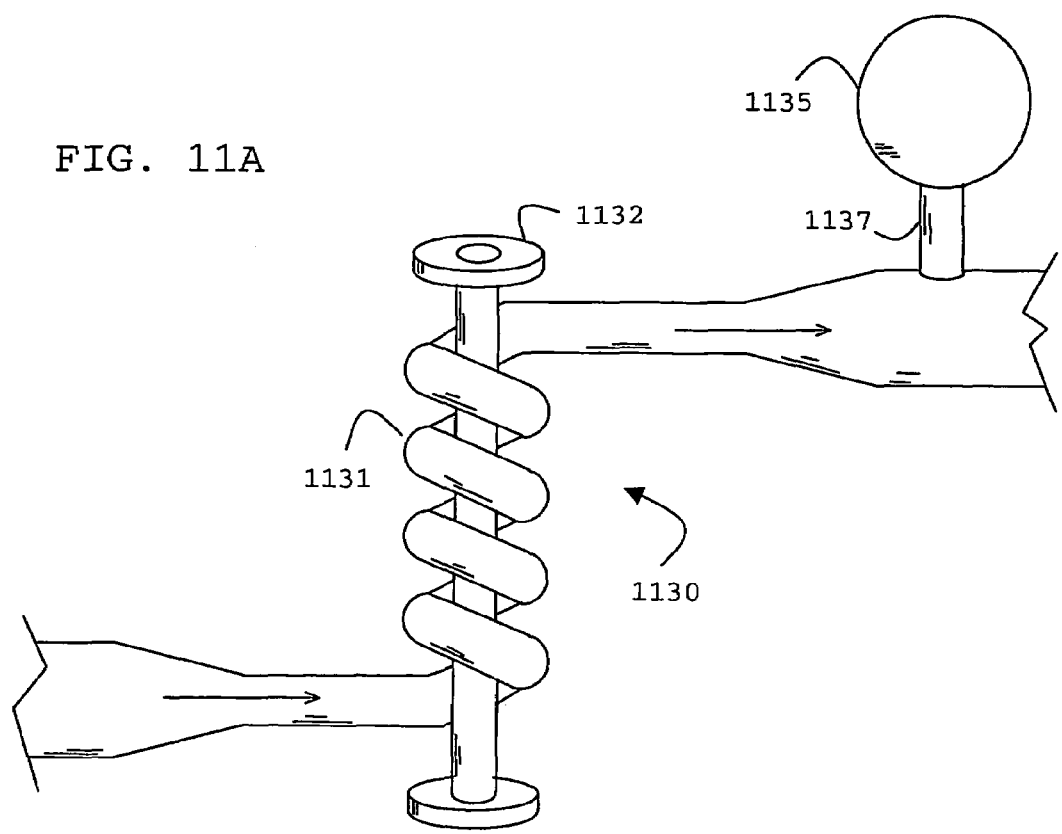
FIG. 11 illustrate alternative examples of the invention.

In FIG. 11A, an L-C low pass mechanical filter is shown. Extended constriction 1131 is used in the Venturi constriction 1130, thus providing a larger inductance, L. The extension in this example is a flexible hose reeled onto a suitable drum 1132. The inductance value is given by substituting h' in equation [2] with the length of the constriction, $L_L$. The capacitive element is still provided by a container 1135, which is connected to the downstream end of the Venturi constriction 1130. Compared to a resonator, the diameter of the "neck" tube 1137 to container 1135 is made as large as possible, and its length as short as possible, such that the inductance at the inlet becomes negligible.

Figure 11B:
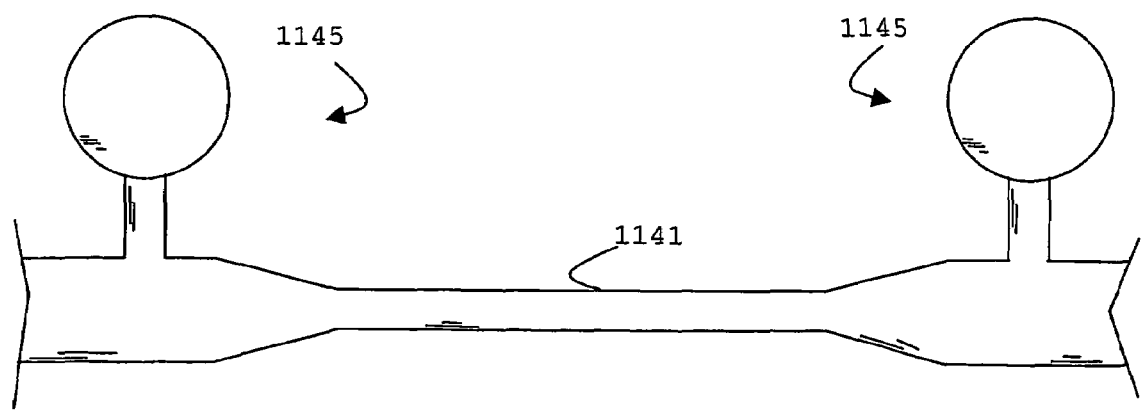
Figure 11C:
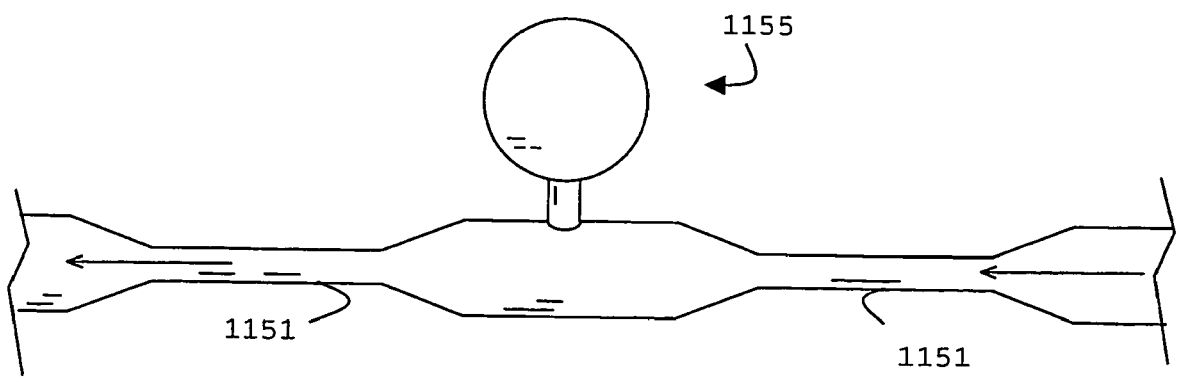

In FIG. 11B, the filter system combines multiple tuned mechanical resonators 1145. They can be mounted close to each other or separated by a distance. In the example of FIG. 11B, TMRs 1145 are separated by a Venturi constriction 1141 in a configuration that can be classified as a Π-type filter. By tuning the resonators to different frequencies, the stop band is broadened. For example, two resonators tuned to 9.5 Hz and 12 Hz, respectively, provide a much wider and deeper stop band compared to a single resonator at 11 Hz. The combination of two resonators tuned to 5 Hz and 11 Hz still provides significant noise reduction in a comparatively broad stop band, thus removing any need to compensate for small variations in the operating pressure.

As shown in FIG. 1C, two Venturi constrictions 1151, 1152 can be combined with one TMR 1155, with constriction 1151 upstream and constriction 1152 downstream of the resonator. This configuration can be seen as a T-type filter.

In applications where the use of a resonator is not practical, the use of one or more in-line Venturi constrictions without a Helmholtz resonator may have already a beneficial effect on the telemetry system. Filters can be developed without using a Helmholtz resonator. Also, several of the above L-C, II, or T-type resonators can be cascaded to design higher order filters with deeper, sharper defined and/or wider stop bands.

Figure 12:
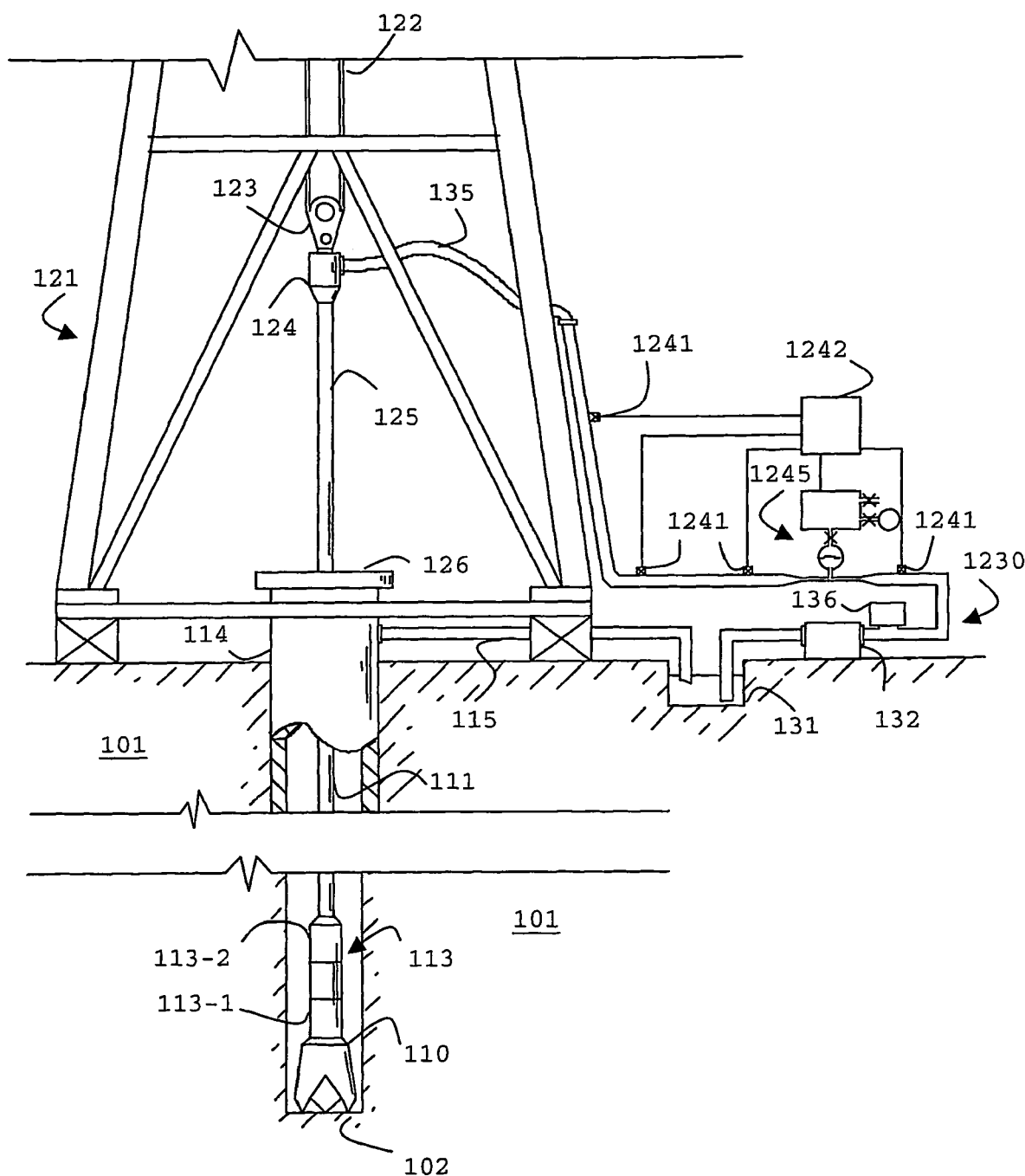
FIG. 12 shows a system for mud pulse telemetry during drilling operations in accordance with an example of the invention.

Referring now to FIG. 12, there is shown the MWD system of FIG. 1 modified to include an example of the invention. Numerals denoting the same or similar elements are left unchanged. For the details description of these elements reference is made to FIG. 1 above.

The MWD system of FIG. 12 includes tunable, and pressure compensated resonator 1245 as described above (FIG. 8). The pressure, influx and outflow of gas and other relevant parameters of TMR 1245 are registered in control unit 1242. Control unit 1242 also registers the pressure measurements provided by four transducers 1241 that are distributed along surface mud flow system 1230 between pump/desurger 132/136 and kelly hose 135. One of transducers 1241 is positioned upstream of the Venturi constriction of TMR 1245.

In operation, control unit 1242 adjusts the resonance frequency of TMR 1245 such that the pump noise is most effectively attenuated within the signal frequency bands using a method as described above.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A mud flow pipeline system connecting a mud pump station to a drill string, said pipeline system comprising at least one acoustic resonator positioned downstream of said mud pump station, and at least one transducer connected to said pipeline system and responsive to pressure variations within said pipeline system positioned downstream of said resonator, wherein said resonator is tuned to provide within a predetermined frequency band a band stop filter for pressure variations within said mud flow pipeline.

2. The pipeline system of claim 1 wherein the resonator has a resonance frequency chosen to provide a band stop filter within a frequency band utilized for signal transmission by a downhole drilling telemetry system.

3. The pipeline system of claim 1 wherein the resonator has a resonance frequency that provide a band stop filter within a frequency band utilized by a mud pulse telemetry system.

4. The pipeline system of claim 1 wherein the resonator has a resonance frequency that provides a band stop filter within a frequency band of 1 to 100 Hz.

5. The pipeline system of claim 1 wherein the resonator is a Helmholtz resonator.

6. The pipeline system of claim 1 wherein the resonator is located in vicinity of a section of the mud flow pipeline system with a reduced inner diameter, forming a complex mechanical filter.

7. The pipeline system of claim 6 wherein the section with the reduced inner diameter is a Venturi constriction.

8. The pipeline system of claim 6 wherein the complex mechanical filter comprises more than one section of reduced diameter or Venturi constriction.

9. The pipeline system of claim 1 wherein the resonator is used in combination with a desurger.

10. The pipeline system of claim 1 wherein the resonator comprises a housing of known volume and one or more neck tubes connecting a drilling fluid carrying pipe with said container.

11. The pipeline system of claim 10 wherein the resonator comprises more than one housing of known volume.

12. The pipeline system of claim 10 wherein the resonator is adapted to receive a pressurized charge of a gaseous medium.

13. The pipeline system of claim 10 wherein the housing comprises at least one opening providing a vent for gaseous media.

14. The pipeline system of claim 12 wherein resonator is connected to a gas reservoir for charging.

15. The pipeline system of claim 1 wherein the resonator is tunable in response to operating pressure and/or temperature within the drilling fluid carrying pipe.

16. The pipeline system of claim 15 further comprising a control unit and one or more valves wherein said control units is adapted to control said one or more valves to charge the resonator with a pressurized fluid medium or discharge it.

17. The pipeline system of claim 15 further comprising one or more valves positioned in a neck tube between resonator and mud flow system and adapted to change the effective cross-section or length of said neck tube.

18. A mechanical acoustic resonator comprising an elastically suspended mass adapted to connect with a pipeline carrying drilling fluid from a mud pump to a drill pipe in a pressure- and/or force-transmitting mode and having a resonant frequency tuned to give enhanced attenuation to pump noise with a predetermined frequency.

19. The resonator of claim 18 being a Helmholtz resonator.

20. The resonator of claim 18 comprising a vessel partly filled with a fluid charge and at least one inlet pipe having an opening to said vessel and an opening to the drill pipe adapted to be an at least partly filled with drilling fluid.

21. The pipeline system of claim 1 used in a mud pulse telemetry system.

22. A method of reducing the noise in a surface mud flow pipeline system, comprising the steps of connecting at least one acoustic resonator to said pipeline system at a position downstream of a mud pump station and at least one transducer responsive to pressure variations within said pipeline system at a position positioned downstream of said resonator, determining a frequency band and tuning said resonator so as to provide a band stop filter for pressure variations within said mud flow pipeline.

23. The method of claim 22, further comprising the step of tuning the resonator during drilling operations.

24. The method of claim 23 wherein the step of tuning the resonator includes the steps of monitoring pressure and/or temperature within the pipeline system, determining a tuning correction with respect to a default tuning setting and altering parameters of the resonator in accordance with said determined correction.

25. The method of claim 22 used in a mud pulse telemetry system.

* * * * *